US008239946B2

(12) United States Patent
Gassoway

(10) Patent No.: US 8,239,946 B2
(45) Date of Patent: Aug. 7, 2012

(54) METHODS AND SYSTEMS FOR COMPUTER SECURITY

(75) Inventor: Paul A. Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1788 days.

(21) Appl. No.: 10/830,127

(22) Filed: Apr. 22, 2004

(65) Prior Publication Data

US 2005/0240769 A1 Oct. 27, 2005

(51) Int. Cl.
G06F 11/30 (2006.01)
G06F 12/14 (2006.01)
G06F 12/16 (2006.01)
(52) U.S. Cl. ......... 726/24; 713/187; 713/188; 713/189
(58) Field of Classification Search ............... 726/22, 726/23, 27–33
See application file for complete search history.

(56) References Cited

U.S. PATENT DOCUMENTS

| 6,324,620 | B1* | 11/2001 | Christenson et al. | 711/112 |
|---|---|---|---|---|
| 6,694,434 | B1* | 2/2004 | McGee et al. | 713/189 |
| 6,760,752 | B1* | 7/2004 | Liu et al. | 709/206 |
| 6,944,772 | B2* | 9/2005 | Dozortsev | 713/187 |
| 7,140,042 | B2* | 11/2006 | Verma | 726/26 |
| 7,469,419 | B2* | 12/2008 | Sobel | 726/24 |
| 7,539,664 | B2* | 5/2009 | Dutta et al. | 707/3 |
| 2002/0174359 | A1 | 11/2002 | Haltmeyer | |
| 2003/0065926 | A1* | 4/2003 | Schultz et al. | 713/188 |
| 2003/0088680 | A1* | 5/2003 | Nachenberg et al. | 709/229 |
| 2003/0163510 | A1 | 8/2003 | Janssen | |
| 2003/0177394 | A1* | 9/2003 | Dozortsev | 713/201 |
| 2003/0217352 | A1 | 11/2003 | Ueno et al. | |
| 2004/0039921 | A1* | 2/2004 | Chuang | 713/187 |
| 2004/0123117 | A1* | 6/2004 | Berger | 713/188 |
| 2004/0205419 | A1* | 10/2004 | Liang et al. | 714/57 |
| 2005/0080816 | A1* | 4/2005 | Shipp | 707/104.1 |

FOREIGN PATENT DOCUMENTS

EP 1227386 7/2002

OTHER PUBLICATIONS

Ravi S. Sandhu et al., "Access Control: Principles and Practice", IEEE Communications Magazine, IEEE Service Center, Piscataway, New Jersey, vol. 32, No. 9, Sep. 1, 1994, pp. 40-48.
European Patent Office Communication Pursuant to Article 94(3) EPC; Application No. 04 822 016.4-2212; Ref: J49156EP; Applicant: Computer Associates Think Inc., May 6, 2009.
Communication from the Formalities Officer at the European Patent Office in Germany mailed Dec. 15, 2009 regarding Application No. 04822016.4 (5 pages), Dec. 15, 2009.
European Patent Office (EPO) Communication regarding Application 04 822 016.4-2212 (14 pages), Jul. 15, 2010.
European Patent Office (EPO) Communication regarding Application 04 822 016.4-2212 (12 pages), Jul. 15, 2010.

* cited by examiner

Primary Examiner — Nasser Goodarzi
Assistant Examiner — Fatoumata Traore
(74) Attorney, Agent, or Firm — Baker Botts L.L.P.

(57) ABSTRACT

A method for maintaining computer security, includes providing a database of known good software, opening a file, identifying the file being opened, determining whether an entry exists in the database of known good software for the identified file and performing at least one of allowing and preventing the opening of the file from continuing based on the result of the determination.

54 Claims, 5 Drawing Sheets

METHODS AND SYSTEMS FOR COMPUTER SECURITY

BACKGROUND

1. Technical Field

The present disclosure relates generally to security and, more particularly, to methods and systems for computer security.

2. Description of the Related Art

With the growth of the Internet, the increased use of computers and the exchange of information between individual users poses a threat to the security of computers. Computer security attempts to ensure the reliable operation of networking and computing resources and attempts to protect information on the computer or network from unauthorized corruption, access or disclosure. Computer system(s) as referred to herein may include(s) individual computers, servers, computing resources, networks, etc., and combinations thereof.

Among the various security threats that present increasingly difficult challenges to the secure operation of computer systems are computer viruses, worms, Trojan horses, etc. Computer viruses are programs that can infect other programs by modifying them in such a way as to include a copy of themselves. Unlike computer viruses, worms do not need to infect other programs. Worms are independent programs that are capable of reproducing themselves, spreading from machine to machine across network connections, often via email.

A Trojan horse may be an executable program that appears to be desirable but is merely disguised as "friendly" and actually contains harmful code, allowing an attacker to come in through a "back door" and perform malicious actions on the computer system. Trojans prey on system vulnerabilities and may be extremely destructive, allowing attackers to monitor, administer, and/or perform any action on a computer system that the user can, just as if they were right in front of it. For a Trojan to gain access to the computer system, the user may first be induced to install the Trojan. For example, this may be done through the offering of anything that a user might find desirable via email, instant messengers, or file sharing tools (i.e., free games, movies, system enhancements, etc.). A user may download a Trojan horse program that appears to be a calculator, performing the functions of a simple pocket calculator. When the user launches the infected file, it may appear to be performing calculations and nothing more. However, it may also be performing a number of harmful actions, such as deleting files, stealing passwords, adding files, disrupting system operation, etc. In addition, the Trojan horse may be an e-mail attachment disguised as a document file, readme file, etc. If a user launches the infected file, the Trojan may initiate installation procedures and/or propagation routines.

Trojan horse programs can be introduced to a computer system by initially being planted in software repositories that many people can access, such as software bulletin boards, publicly accessible directories, file-sharing systems, such as the KaZaA network, etc. Users accessing these repositories are then tricked into copying the Trojan horse program into their own computer systems. These users then can further spread the Trojan horse by sharing the infected program with other users, most especially if the program performs a useful function and causes no immediate or obvious damage.

Users may utilize anti-virus programs in order to protect their computer systems from security threats such as Trojan horses. Anti-virus programs operate to protect from the spread of viruses by detecting the virus and isolating or removing the viral code. Examples of anti-virus software may include activity monitoring programs, scanning programs, and/or integrity checking programs. Activity monitoring programs attempt to prevent the infection of computer systems by searching for "virus-like" activity, such as, attempts to delete a file, or to write to an executable file, and may then attempt to prevent this activity from taking place. Virus scanning programs may contain a list of previously defined virus signatures, containing the binary patterns of a virus, each associated with a virus and scan the various files of a system looking for a match to a particular virus signature. If a virus is detected, the user may be notified and further steps may be taken to rid the system of the malicious code. Integrity checking programs compute a checksum value for all of the uninfected, executable files residing on the computer system and compare the computed checksum values to checksum values generated at a later time to determine if anything has changed in the file. If the checksums match, then the executable file is uninfected. However, if the checksums do not match, then the executable file may possibly be infected and steps may be taken to remove the infected file.

Anti-virus software programs may not provide a computer user with comprehensive protection against Trojans. For example, activity monitoring programs may not adequately prevent Trojan horses because it is hard for them to distinguish between a Trojan horse that, for example, is maliciously deleting a system's file, and a regular program that is supposed to delete a system's file. Virus scanning software may detect viruses present in the system, but it may do nothing to prevent them from infiltrating the system in the first place. The virus scanning software should be continuously updated in order to be effective in detecting new and modified Trojans. This not only proves to be a very tedious and time consuming task for computer users, but also may not happen often enough to provide adequate safeguards against foreign intrusions. Integrity checking programs not only do not know which viruses they are in fact detecting; but in cases where a file has been legitimately modified, they may also require the user to verify whether or not the detected executable file contains a virus. There is a window of time between when a new attack is released to the public, and when anti-virus products have signatures to detect the attack. During this window of time, the attack is given the opportunity to do its damage. Therefore, just because a user has installed and is running an anti-virus program does not necessarily mean that the user's system is no longer vulnerable to security threats.

SUMMARY

A method for maintaining computer security, comprises providing a database of known good software, opening a file, identifying the file being opened, determining whether an entry exists in the database of known good software for the identified file and performing at least one of allowing and preventing the opening of the file from continuing based on the result of the determination.

A system for maintaining computer security, comprises a database of known good software, a system for opening a file, a system for identifying the file being opened, a system for determining whether an entry exists in the database of known good software for the identified file and a system for performing at least one of allowing and preventing the opening of the file from continuing based on the result of the determination.

A computer recording medium including computer executable code for maintaining computer security, comprises code for providing a database of known good software, code for opening a file, code for identifying the file being opened, code for determining whether an entry exists in the database of known good software for the identified file and code for performing at least one of allowing and preventing the opening of the file from continuing based on the result of the determination.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for maintaining computer security. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Software as the term is used herein may include executable instructions (e.g., one or more programs) and/or data that can be stored electronically. An application is a program or group of programs designed for end users and may include systems software and applications software. Virtually all information stored in a computer is stored in a file. There are many different types of files, including data files, text files, program files, directory files, etc. In effect, a file is a collection of instructions and/or data that has a name associated to it, called a file name.

Figure 1:
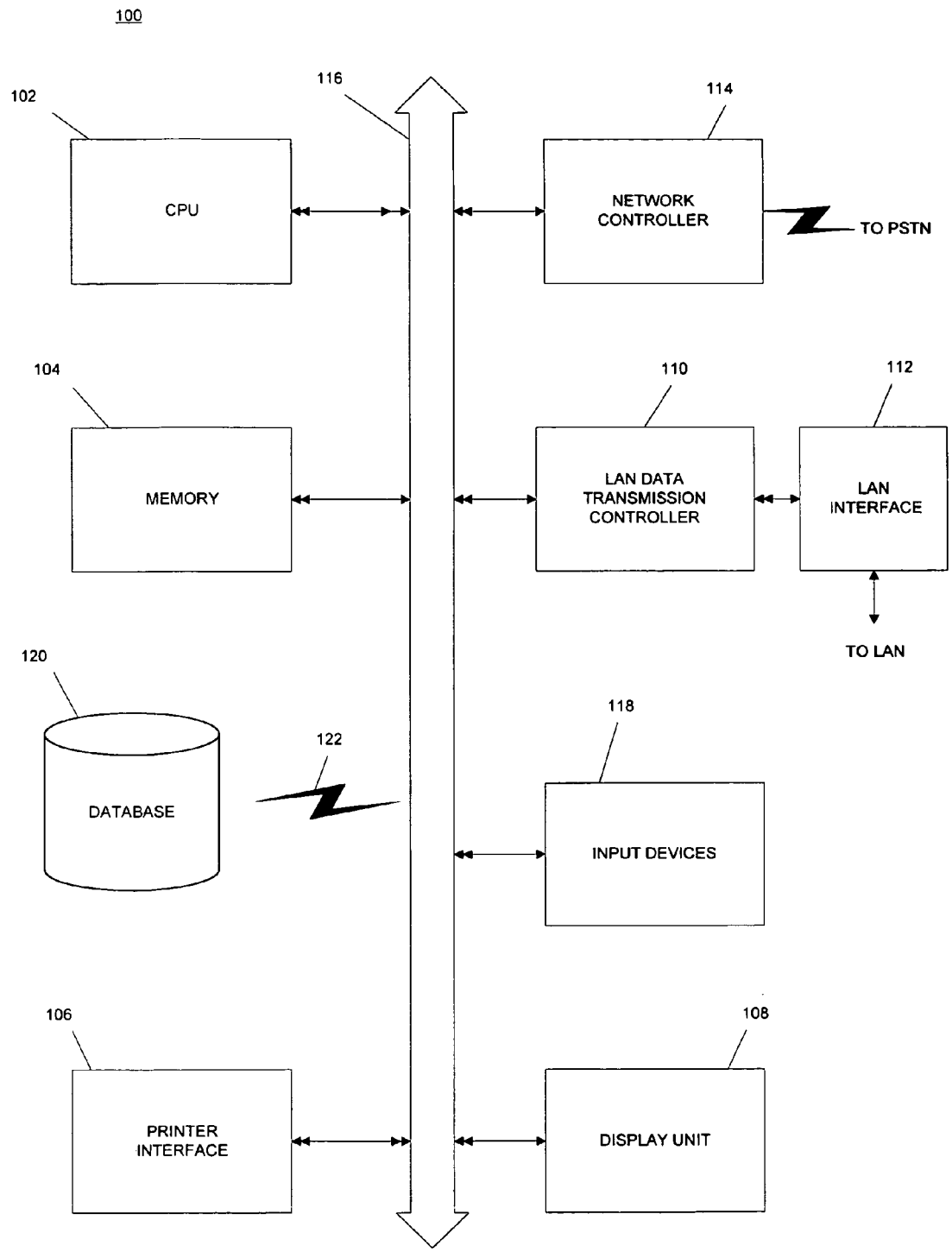
FIG. 1 shows a block diagram of an exemplary computer system capable of implementing the method and system of the present application.

FIG. 1 shows an example of a computer system 100 which may implement the method and system of the present disclosure. The system and method of the present disclosure may be implemented in the form of a program running on a computer system, for example, a mainframe, personal computer (PC), handheld computer, server, etc. The program may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

According to an embodiment of the present disclosure, a list of known good software is maintained. The list may be in the form of one or more databases provided remotely and/or locally on the computer system. When a file is opened, the system identifies the file and checks to determine whether an entry for the file exists in the list of known good software. If an entry exists, the system is allowed to proceed opening the file without interference. For example, if the file is an executable program file, the program is allowed to execute. However, if an entry for the files does not exist in the list, the system can monitor the execution of the program so that if the program attempts to perform a suspect action, such as a change to the operating system registry, settings, and/or change of another executable's file, etc., the user can be prompted before the program is allowed to continue. The user is thus able to prevent the process from doing damage to the system. If a program has been allowed to run on the system for some time, the system can automatically add an entry for the file to the list of known good software.

Figure 2:
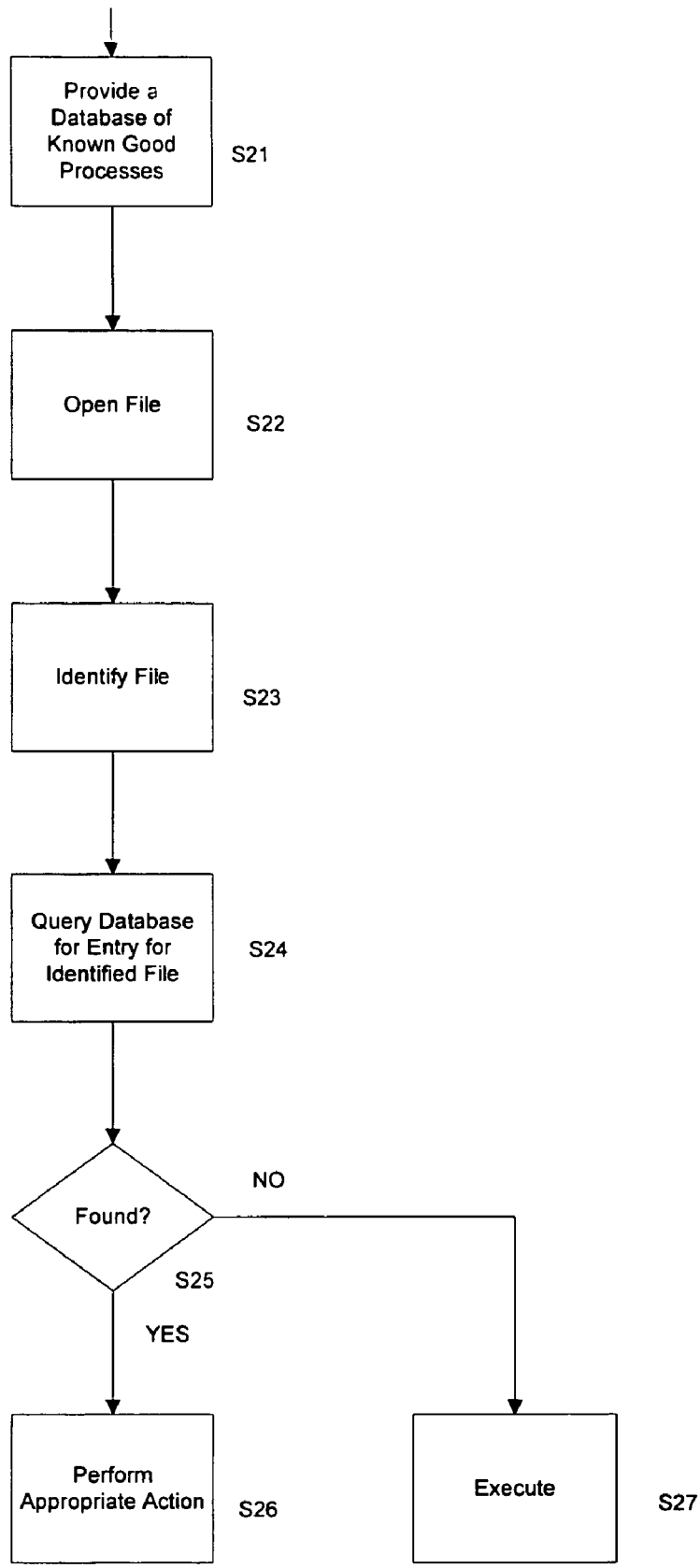
FIG. 2 shows a flow chart of a method for maintaining computer security, according to an embodiment of the present disclosure.

A more detailed description of a method for maintaining computer security, according to an embodiment of the present disclosure, will be described with reference to FIG. 2. A list (e.g., one or more databases) of known good software is provided (Step S21). The database may include entries uniquely identifying each piece of software listed in the database. When a file is going to be opened (Step S22) it is identified (Step S23) and compared with entries in the list of known good software (Step S24). Appropriate operations may then be performed on the file (Step S25) depending on whether an entry for the file is in the database for known good software. For example, if the file is a program file, if it is determined that the file corresponds to an entry in the database for known good software (Yes, Step S25), the program can be allowed to freely execute (Step S27). If there is no entry in the database for known good software (No, Step S25), the system can perform an appropriate operation on the file (Step S26) which may include monitoring the program for suspicious activities. For example, as will be described in more detail below, one or more operating system call hooks can be placed and used to monitor the program.

According to an embodiment of the present disclosure, when the file is opened the file may be identified by determining a unique value for the file. For example, the unique value may be a hash value generated in accordance with a number of existing methods and technologies, such as one-way hashing techniques (for example, MD5, SHA, etc.), etc.

According to another embodiment of the present disclosure, a database of unfamiliar software may be provided. When a file is being opened, the file is identified. It is then determined whether the file is listed in the database of unfamiliar software. Appropriate operations may then be performed on the file depending on whether the file is listed in the database. For example, if it is determined that the file is listed in the database for unfamiliar software and the file is a program file, one or more operating system (OS) call hooks can be placed in the program. Several OS calls may be hooked, including but not limited to, updating the registry, opening files, etc. When the call hook occurs, the execution of the program is halted until it is granted permission to proceed. The operation system call hooks will be described in more detail below.

According to another embodiment of the present disclosure, the database of unfamiliar software may include timestamp information indicating, for example, how long an entry for each unfamiliar file has been in the database of unfamiliar software (e.g., a date stamp), the number of times an unfamiliar file has been opened and/or the number of times an unfamiliar piece of software has been executed, etc.

Figure 3A:
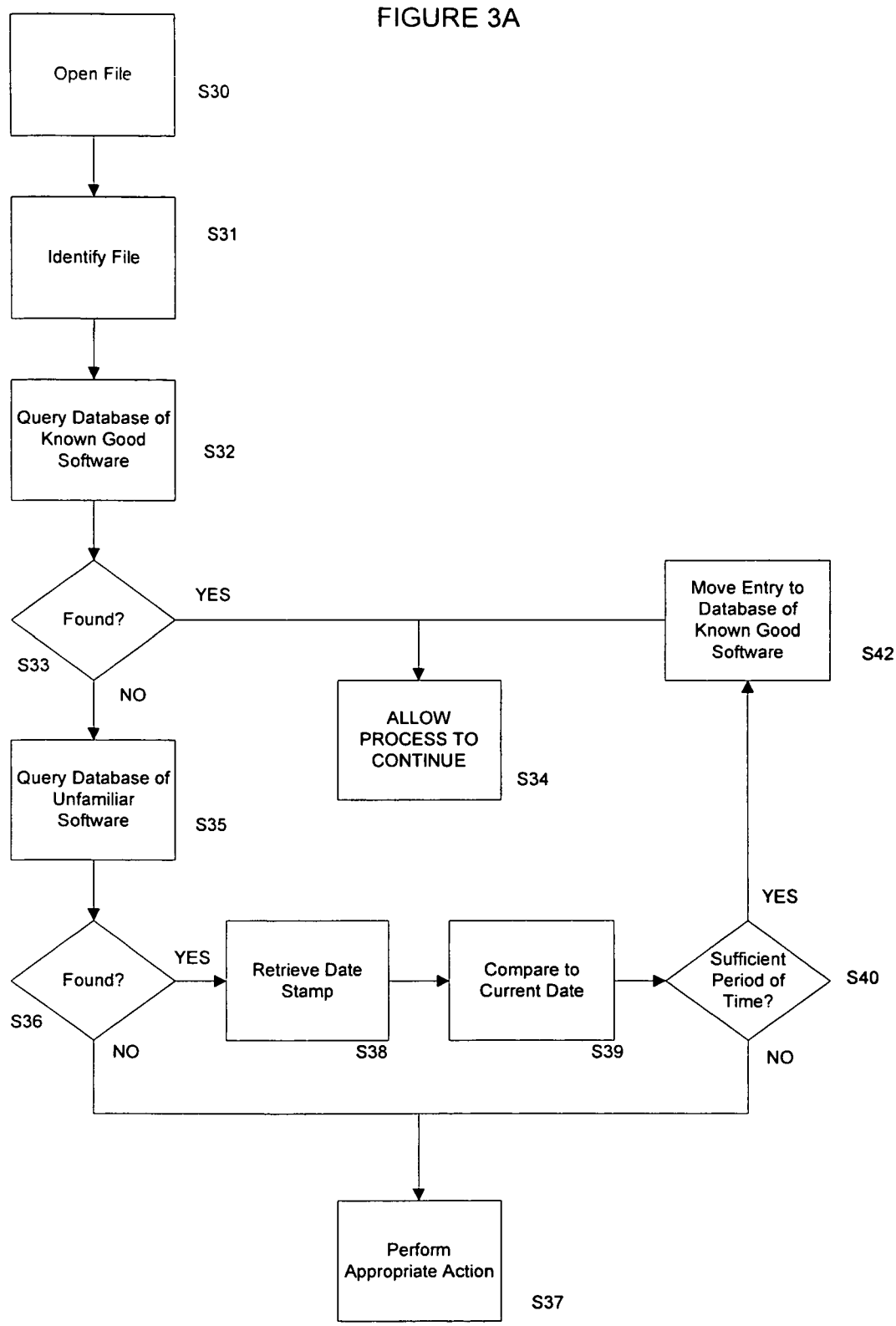
FIGS. 3A and 3B show a flow chart and schematic diagram respectively illustrating a system and method for maintaining computer security, according to an embodiment of the present disclosure.
Figure 3B:
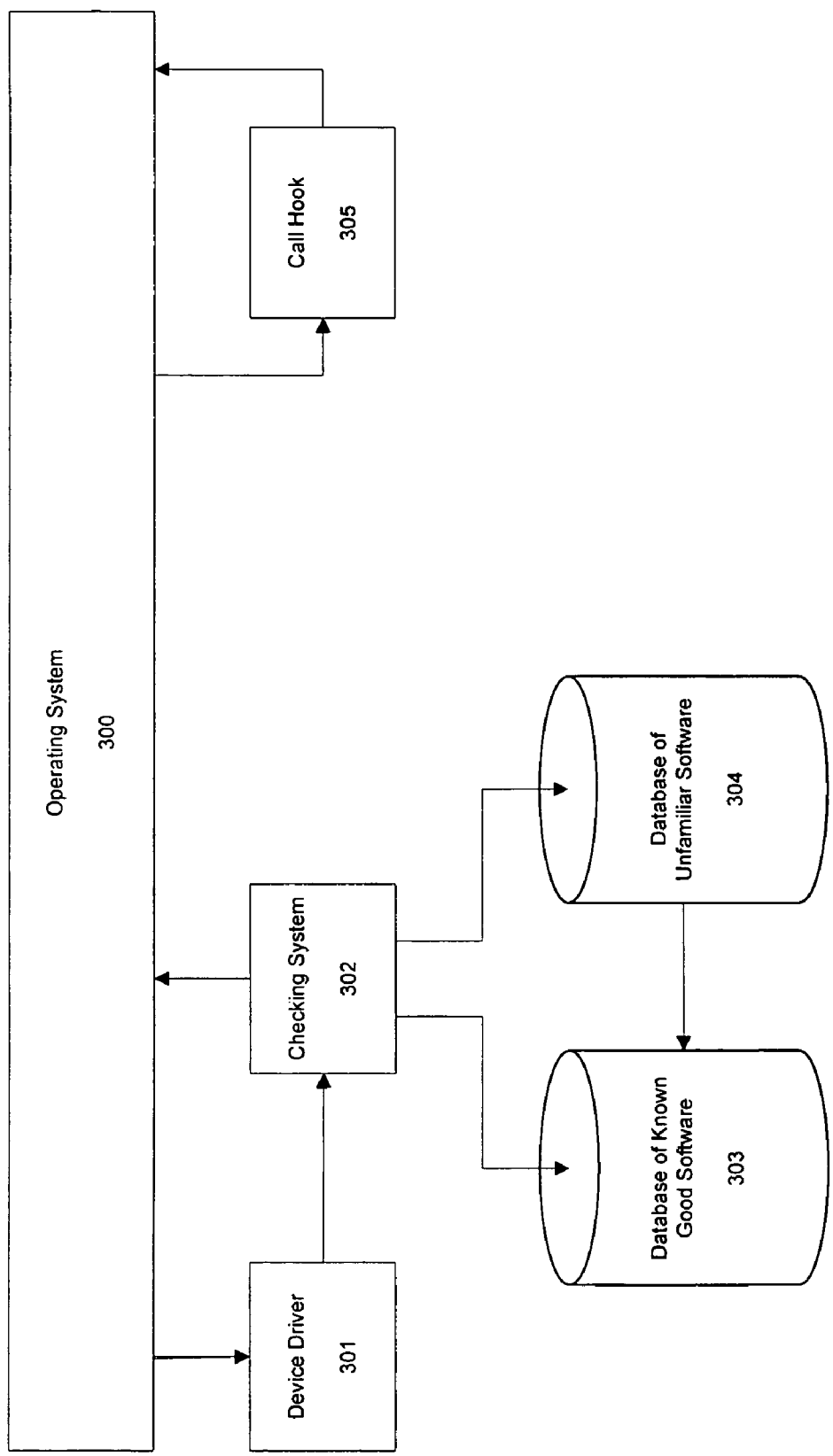

An embodiment of the present disclosure will be described with reference to FIGS. 3A and 3B. The operating system 300 opens the file (Step S30) and device driver 301 reads and identifies the file (Step S31). Once the file is identified, checking device 302 queries the database of known good software 303 (Step S32) and determines if there is a corresponding entry in the database of known good software 303. If it is determined that there is an entry for the file in the database of known good software 303 (Yes, Step S33), operating system 300 is allowed to continue opening and utilizing the contents of the file (Step S34). For example, if the file contains an executable, the operating system 300 is allowed to let the executable begin. If it is determined that there is no corresponding entry in the database of known good software 303 (No, Step S33), checking device 302 queries the database of unfamiliar software 304 (Step S35) and determines if there is a corresponding entry in the database of unfamiliar software 304. If an entry is not found (No, Step S36), an appropriate action can be performed (Step S37). For example, a new entry for the file can be made in the database of unfamiliar software 304. The entry may include information indicating the date the entry was added to the database. If it is determined that there is an entry for the file in the database of unfamiliar software 304 (Yes, Step S36), the operating system is allowed to continue opening the file. However, the system monitors it for suspicious activity. For example, if the file contains an executable, when the process starts, one or more operating system call hooks 305 may be placed and the process is allowed to continue. In addition, if an entry was found in the database of unfamiliar software 304, the date stamp for the file entry can be retrieved (Step S38) and compared with the current date (Step S39). If it is determined that the entry has been in the database for unfamiliar software 304 for a sufficient period of time (e.g., a month or more) (Yes, Step S40), then the entry information can be moved from the database of unfamiliar software 304 to the database for known good software 303 (Step S42) and the system is allowed to continue opening and utilizing the contents of the file (Step S34). If the entry has not been in the database for unfamiliar software 304 for a sufficient period of time (No, Step S40), an appropriate action can be performed (Step S37).

In addition, as mentioned above, entries in the database of unfamiliar software may include the number of times the unfamiliar file has been opened and/or the number of times the unfamiliar piece of software has been executed. These values can be compared with baseline values. If the number is (are) greater than the baseline values, the entry information for the file can be moved from the database of unfamiliar software to the database for known good software.

According to various embodiments of the present disclosure, performing an operating system call hook includes notifying a Trojan notification service that the file corresponds to an entry in the database for unfamiliar processes and prompting the user for input about whether the operating system call should be passed along or should fail. If the operating system call is passed along, then the operating system is allowed to proceed with opening the file.

The OS call hook exists in kernal space and cannot interact with the user. Therefore, according to an embodiment of the present disclosure, a service such as a Trojan notification service may be notified when the call hook occurs. The service may then notify the user via any suitable manner (e.g., email) of the action that is being performed. When the user then decides to allow or not allow the action, the user can notify the Trojan notification service. The Trojan notification service can then return this information to the computer system. In response, the operating system can allow the call to pass along or fail accordingly.

Figure 4:
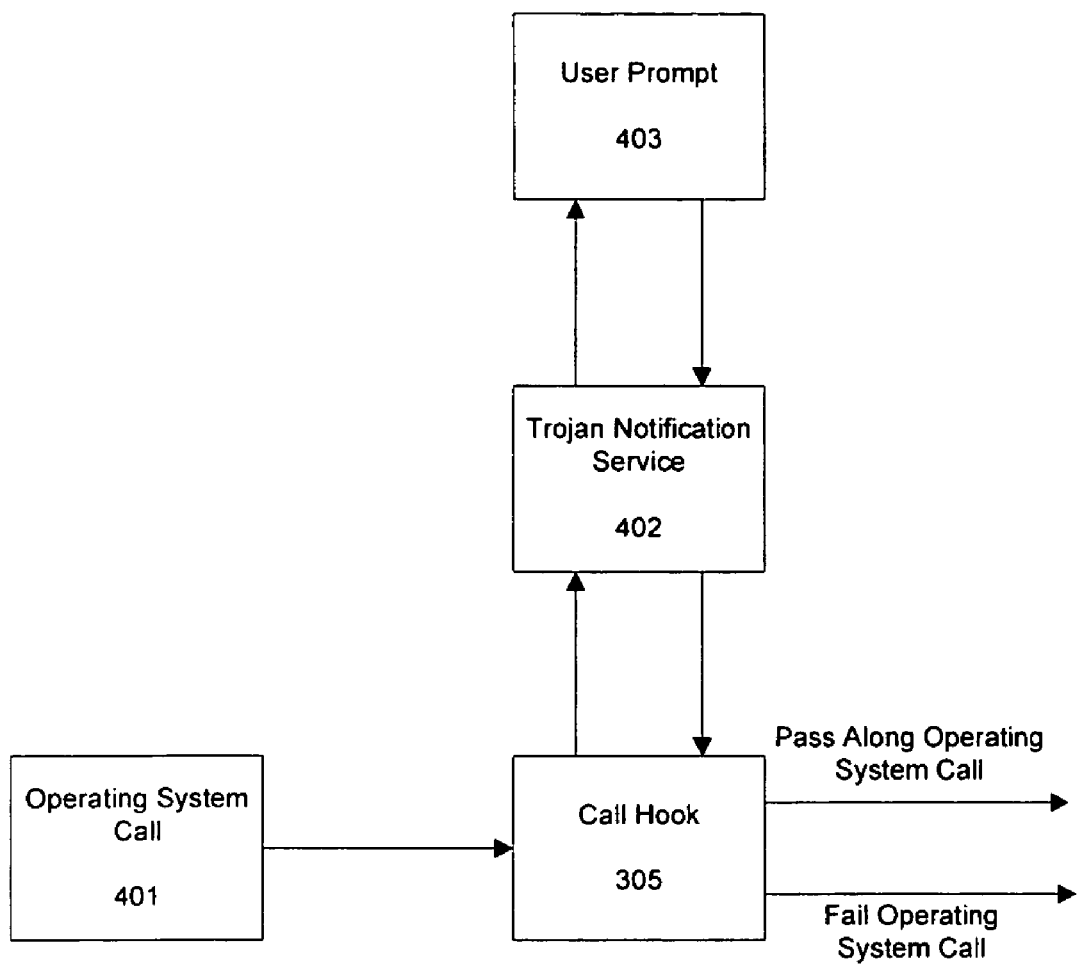
FIG. 4 shows a schematic diagram illustrating the functioning of a call hook, according to an embodiment of the present disclosure.

FIG. 4 is a schematic diagram illustrating the functioning of a call hook, according to an embodiment of the present disclosure. Performing an operating system call hook 305 involves "hooking" a file's operating system calls 401 (e.g., updating the registry, opening files, etc.) and not allowing the operation to continue until allowed. When the operating system call hook 305 occurs, the Trojan notification service 402 is notified. Trojan notification service 402 then performs a user prompt 403, prompting the user of the system for input about whether the operating system call should be allowed. Once the user decides whether to allow or not allow the action, the result is passed back through the Trojan notification service 402 to the operating system call hook 305 which then allows the operating system call to proceed or prevents the operating system from performing the hooked call.

Numerous additional modifications and variations of the present disclosure are possible in view of the above-teachings. It is therefore to be understood that within the scope of the appended claims, the present disclosure may be practiced other than as specifically described herein.

What is claimed is:

1. A computer-implemented method for maintaining computer security, comprising:
   providing a database of known good software;
   providing a database of unfamiliar software;
   opening a file;
   identifying the file being opened;
   determining, using a central processing unit, whether an entry exists in the database of known good software for the identified file;
   determining, using the central processing unit, whether an entry exists in the database of unfamiliar software for the identified file;
   moving the entry from the database of unfamiliar software to the database of known good software if it is determined that the entry has been in the database of unfamiliar software for a predetermined period of time; and
   performing at least one of allowing and preventing the opening of the file from continuing based on the result of the determination of whether the entry exists in the database of known good software.

2. The method of claim 1, wherein the file comprises an executable file.

3. The method of claim 2, wherein the executable file comprises an application.

4. The method of claim 1, wherein identifying the file being opened comprises determining a unique value of the file, the unique value being a hash value generated according to a hashing algorithm and comparing the unique value to entries in the database of known good software.

5. The method of claim 4, wherein the performing at least one of allowing and preventing the opening of the file from continuing comprises allowing the file to continue to be opened if it is determined that the determined unique value corresponds to an entry in the database of known good software.

6. The method of claim 1, further comprising providing date stamp information for each entry in the database of unfamiliar software indicating a date on which the entry was first made.

7. The method of claim 6, further comprising determining an amount of time an entry has been in the database of unfamiliar software by comparing the date stamp information with a current date.

8. The method of claim 1, further comprising providing a value for each entry in the database of unfamiliar software indicating a number of times a file corresponding to the entry was opened.

9. The method of claim 8, wherein the value comprises the number of times an executable in a file has been executed.

10. The method of claim 8, further comprising moving the entry from the database of unfamiliar software to the database of known good software if the number of times the file corresponding to the entry was opened is greater than a baseline value.

11. The method of claim 1, further comprising adding an entry to the database of unfamiliar software if an entry for the identified file is not found in at least one of the database of known good software and the database of unfamiliar software.

12. The method of claim 1, further comprising placing at least one operating system call hook if it is determined that an entry exists in the database of unfamiliar software.

13. The method of claim 12, wherein the operating system call hook notifies a Trojan notification service that a file corresponds to an entry in the database of unfamiliar software.

14. The method of claim 13, wherein the Trojan notification service prompts a user for input regarding whether the operating system call should be passed along.

15. The method of claim 14, wherein opening of the file is allowed to proceed if the operating system call is passed along.

16. The method of claim 1, wherein a sufficient period of time comprises a month or longer.

17. A system for maintaining computer security, comprising:
   a database of known good software;
   a database of unfamiliar software;
   one or more central processing units operable to execute:
      a system for opening a file;
      a system for identifying the file being opened;
      a system for determining whether an entry exists in the database of known good software for the identified file;
      a system for determining whether an entry exists in the database of unfamiliar software for the identified file;
      a system for moving the entry from the database of unfamiliar software to the database of known good software if it is determined that the entry has been in the database of unfamiliar software for a predetermined period of time; and
      a system for performing at least one of allowing and preventing the opening of the file from continuing based on the result of the determination of whether the entry exists in the database of known good software.

18. The system of claim 17, wherein the file comprises an executable file.

19. The system of claim 18, wherein the executable file comprises an application.

20. The system of claim 17, wherein the system for identifying the file being opened comprises a system for determining a unique value of the file, the unique value being a hash value generated according to a hashing algorithm and a system for comparing the unique value to entries in the database of known good software.

21. The system of claim 20, wherein the system for performing at least one of allowing and preventing the opening of the file from continuing comprises a system for allowing the file to continue to be opened if it is determined that the determined unique value corresponds to an entry in the database of known good software.

22. The system of claim 17, further comprising a system for providing date stamp information for each entry in the database of unfamiliar software indicating a date on which the entry was first made.

23. The system of claim 22, further comprising a system for determining an amount of time an entry has been in the database of unfamiliar software by comparing the date stamp information with a current date.

24. The system of claim 17, further comprising a system for providing a value for each entry in the database of unfamiliar software indicating a number of times a file corresponding to the entry was opened.

25. The system of claim 24, wherein the value comprises the number of times an executable in a file has been executed.

26. The system of claim 24, further comprising a system for moving the entry from the database of unfamiliar software to the database of known good software if the number of times the file corresponding to the entry was opened is greater than a baseline value.

27. The system of claim 17, further comprising a system for adding an entry to the database of unfamiliar software if an entry for the identified file is not found in at least one of the database of known good software and the database of unfamiliar software.

28. The system of claim 17, further comprising a system for placing at least one operating system call hook if it is determined that an entry exists in the database of unfamiliar software.

29. The system of claim 28, wherein the operating system call hook notifies a Trojan notification service that a file corresponds to an entry in the database of unfamiliar software.

30. The system of claim 29, wherein the Trojan notification service prompts a user for input regarding whether the operating system call should be passed along.

31. The system of claim 30, wherein opening of the file is allowed to proceed if the operating system call is passed along.

32. The system of claim 17, wherein a sufficient period of time comprises a month or longer.

33. The system of claim 17, further comprising a processor.

34. A tangible program storage device including computer executable code for maintaining computer security, comprising:
   code for providing a database of known good software;
   code for providing a database of unfamiliar software;
   code for opening a file;
   code for identifying the file being opened;
   code for determining whether an entry exists in the database of known good software for the identified file;

code for determining whether an entry exists in the database of unfamiliar software for the identified file;

code for moving the entry from the database of unfamiliar software to the database of known good software if it is determined that the entry has been in the database of unfamiliar software for a predetermined period of time; and code for performing at least one of allowing and preventing the opening of the file from continuing based on the result of the determination of whether the entry exists in the database of known good software.

35. The program storage device of claim 34, wherein the file comprises an executable file.

36. The program storage device of claim 35, wherein the executable file comprises an application.

37. The program storage device of claim 34, wherein the code for identifying the file being opened comprises code for determining a unique value of the file, the unique value being a hash value generated according to a hashing algorithm and code for comparing the unique value to entries in the database of known good software.

38. The program storage device of claim 37, wherein the code for performing at least one of allowing and preventing the opening of the file from continuing comprises code for allowing the file to continue to be opened if it is determined that the determined unique value corresponds to an entry in the database of known good software.

39. The program storage device of claim 34, further comprising code for providing date stamp information for each entry in the database of unfamiliar software indicating a date on which the entry was first made.

40. The program storage device of claim 39, further comprising code for determining an amount of time an entry has been in the database of unfamiliar software by comparing the date stamp information with a current date.

41. The program storage device of claim 34, further comprising code for providing a value for each entry in the database of unfamiliar software indicating a number of times a file corresponding to the entry was opened.

42. The program storage device of claim 41, wherein the value comprises the number of times an executable in a file has been executed.

43. The program storage device of claim 41, further comprising code for moving the entry from the database of unfamiliar software to the database of known good software if the number of times the file corresponding to the entry was opened is greater than a baseline value.

44. The program storage device of claim 34, further comprising code for adding an entry to the database of unfamiliar software if an entry for the identified file is not found in at least one of the database of known good software and the database of unfamiliar software.

45. The program storage device of claim 34, further comprising code for placing at least one operating system call hook if it is determined that an entry exists in the database of unfamiliar software.

46. The program storage device of claim 45, wherein the operating system call hook notifies a Trojan notification service that a file corresponds to an entry in the database of unfamiliar software.

47. The program storage device of claim 46, wherein the Trojan notification service prompts a user for input regarding whether the operating system call should be passed along.

48. The program storage device of claim 47, wherein opening of the file is allowed to proceed if the operating system call is passed along.

49. The program storage device of claim 34, wherein a sufficient period of time comprises a month or longer.

50. A computer-implemented method for computer security, comprising:

identifying a file;

determining, using a central processing unit, whether an entry for the file exists in database of unfamiliar software;

determining, using the central processing unit, quantitative information regarding the file for use in identifying whether the file should be added to a database of known good software, the quantitative information selected from the group consisting of a length of time the entry has been in the database of unfamiliar software, a number of times the file has been opened, and a number of times an executable in the file has been executed;

adding the entry for the file to the database of known good software if the quantitative information exceeds a predetermined value; and allowing the opening of the file to continue if the database of known good software includes the entry for the file.

51. The method of claim 50, further comprising removing the entry for the file from the database of unfamiliar software if the quantitative information exceeds a predetermined value.

52. The method of claim 50, further comprising preventing the opening of the file to continue if:

the database of known good software does not include the entry for the file; and the file attempts a suspicious activity.

53. The method of claim 52, wherein a suspicious activity comprises updating a registry.

54. The method of claim 52, wherein a suspicious activity comprises opening a second file.

* * * * *